T862,012

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 6, 1969

862 O.G. 24

789,435

METHOD FOR EXTENDING THE FLASH LIFE OF VAPOR-FILLED ELECTRIC DISCHARGE LAMPS

Roger C. Baetzold, Kodak Park,
Rochester, N.Y. 14650

Filed Jan. 7, 1969. Published May 6, 1969
Int. Cl. H01j *37/04, 37/32*
U.S. Cl. 250—50
1 Sheet Drawing. 3 Pages Specification

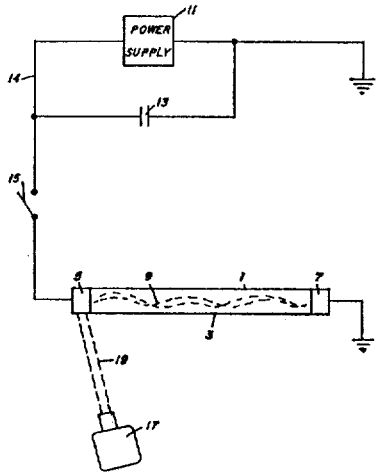

A method for extending the flash-life of vapor-filled electric discharge lamps which comprises exposing the lamps to ultraviolet radiation prior to and coincident with operation of the lamp. The ultraviolet radiation can be directed toward any portion of the lamps, but best results are obtained when the radiation is directed at the cathode.

T862012
SN - 789435
May 6, 1969 R. C. BAETZOLD DEF. PUB.
METHOD FOR EXTENDING THE FLASH LIFE OF VAPOR-FILLED ELECTRIC DISCHARGE LAMPS
Filed Jan. 7, 1969
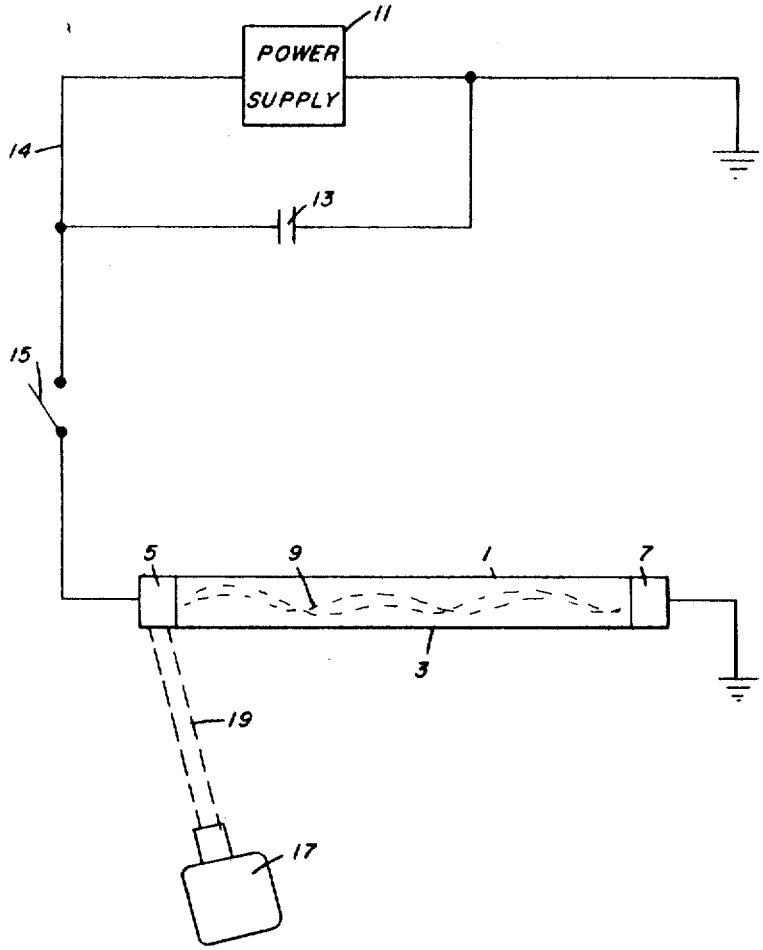
ROGER C. BAETZOLD
INVENTOR.
BY Morton A. Polster
ATTORNEY